April 10, 1934.  H. JOSEPHSON  1,954,529
BRAKE MECHANISM FOR AUTOMOBILES
Original Filed Sept. 22, 1917   3 Sheets-Sheet 1

INVENTOR.
Henry Josephson
BY McConkey and Smith
ATTORNEYS.

April 10, 1934.　　　　H. JOSEPHSON　　　　1,954,529
BRAKE MECHANISM FOR AUTOMOBILES
Original Filed Sept. 22, 1917　　3 Sheets-Sheet 2

INVENTOR.
Henry Josephson
BY McConkey and Smith
ATTORNEYS

April 10, 1934.  H. JOSEPHSON  1,954,529
BRAKE MECHANISM FOR AUTOMOBILES
Original Filed Sept. 22, 1917   3 Sheets-Sheet 3

INVENTOR.
Henry Josephson
BY
M. W. McConkey
ATTORNEY.

Patented Apr. 10, 1934

1,954,529

UNITED STATES PATENT OFFICE 1,954,529

BRAKE MECHANISM FOR AUTOMOBILES

Henry Josephson, Cleveland, Ohio, assignor, by mesne assignments, to Bendix Aviation Corporation, New York, N. Y., a corporation of Delaware Refiled for abandoned application Serial No. 192,657, September 22, 1917. This application August 2, 1928, Serial No. 296,877

15 Claims. (Cl. 188—204)

This invention relates to improvements in brake-mechanism for automobiles, and pertains more especially to brake-mechanism for an automobile in which each driven rear axle-section and connected rear wheel of the vehicle are adapted to be braked by means comprising a brake-drum which is connected to and rotatable with said wheel and axle-section and comprises an annular brake-member arranged concentrically relative to said axle-section and wheel and adapted to be frictionally engaged by two brake-shoes arranged internally and externally respectively of said brake-drum.

One object of this invention is to provide improved means whereby said brake-shoes may be simultaneously actuated into frictional engagement with said brake-drum, by motion transmitted from a lever within reach of the operator, without injury or undue shock to the vehicle and without discomfort or material disturbance to the occupant or occupants of the vehicle.

Another object is to provide a pair of brake-operating shafts adjacent each rear wheel and connected axle-section of the vehicle and not only to employ said shafts in effecting the actuation, into their braking position, of two brake-shoes employed in braking said wheel and axle-section, but to insure the operation of said shafts simultaneously and in unison, and to enable the operator to adequately but gently brake the vehicle and bring the vehicle to a timely and agreeable stop.

Another object is not only to provide means whereby one of two brake-shoes employed in braking one and the same rotary member of the vehicle is actuated into its braking position during rotation in one direction of one brake-operating shaft and to provide mechanism whereby the other of said brake-shoes is actuated into its braking position during rotation in one direction of another brake-operating shaft, but to employ a loosely mounted lever and to provide such a connection between said lever and one shaft that the last-mentioned shaft is capable of its aforesaid rotation independently of said lever and said rotation of said last-mentioned shaft is effected by and during the required actuation of said lever.

Another object is to employ a lever loosely mounted relative to one shaft of a pair of brake-operating shafts and arranged to actuate an arm with which said shaft is provided in the direction required to effect the brake-applying rotation of said shaft and to have such a relative arrangement of parts that said shaft is capable of said rotation independently of said lever, and to provide means whereby said lever and an arm with which the other shaft is provided may be actuated in unison as required to actuate both shafts simultaneously in the direction required to effect their brake-applying rotation.

Another object is to employ an equalizing bar which is substantially parallel with a pair of brake-operating shafts and to provide such a connection between said bar and arms with which said shafts are provided that one of said shafts is capable of its brake-applying rotation independently of the other of said shafts and that the brake-applying rotation of both shafts is effected during the required actuation of said bar.

Another object is not only to loosely mount a tubular brake-operating shaft on another brake-operating shaft but to provide efficient and reliable means for effecting the brake-applying rotation of both shafts simultaneously.

Another object is to provide such a connection between an equalizing bar and said tubular or outer shaft and between said bar and the inner shaft surrounded by said tubular or outer shaft that the brake-applying rotation of both shafts is effected during the required actuation of said bar.

Another object is to provide such a connection between each of said inner and outer shafts and an equalizing bar that not only is the brake-applying rotation of both shafts effected during the required actuation of said bar but that the brake-applying rotation of one of said shafts may be effected independently of said bar and independently of the other of said shafts.

Another object is to employ a pair of brake-operating shafts for effecting the actuation into their braking position of brake-shoes adapted to participate in the braking of one of the rear wheels and connected axle-section of an automobile and to have an equalizing bar associated with said pair of shafts and to provide a corresponding equalizing bar and associated pair of brake-operating shafts for the other rear wheel and connected axle section of the vehicle and to provide such a connection between each equalizing bar and the associated pair of brake-operating shafts that the brake-applying rotation of said shafts is effected during the required actuation of said bar, and to provide means whereby both of said equalizing bars may be actuated simultaneously in the direction required to effect the brake-applying rotation of all of said shafts simultaneously.

Another object is to provide such a connection between said equalizing bars and a suitably applied additional equalizing bar that the required actuation of the last-mentioned bar results in the hereinbefore mentioned actuation of the first-mentioned equalizing bars.

With these objects in view, and to attain any other object hereinafter appearing, this invention consists in certain features of construction, and combinations and relative arrangement of parts, hereinafter described in this specification, pointed out in the claims, and illustrated in the accompanying drawings. In said drawings, Figure 1 is a top plan of portions of an automobile provided with brake-mechanism embodying my invention;

Figure 3:
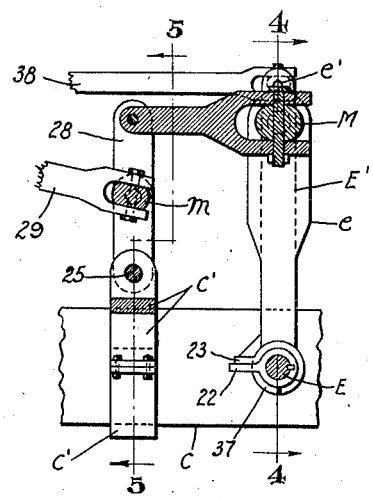
Figure 3 is a vertical section, in detail, taken along the line 3—3, Figure 1.
Figure 4:
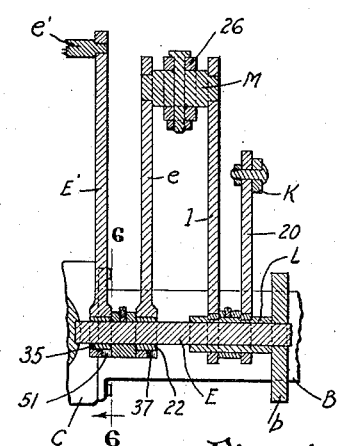
Figure 4 is a vertical section taken along the line 4—4, Figure 3.
Figure 6:
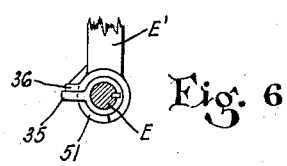
Figure 5:
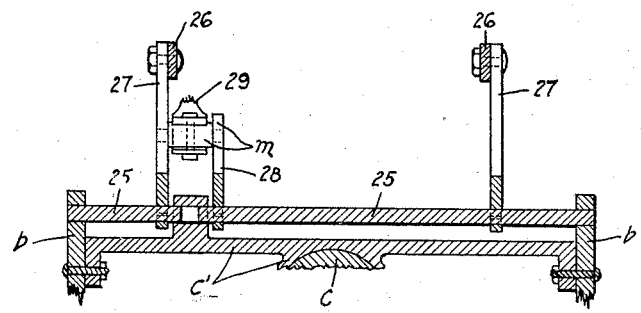
Figure 5 is a vertical section taken along the line 5—5, Figure 3.

Figure 6 is a vertical section, in detail, taken along the line 6—6, Figure 4. Portions are broken away in the drawings to reduce their size, and Figures 3, 4, 5 and 6 are drawn on a larger scale than Figures 1 and 2.

Figure 1:
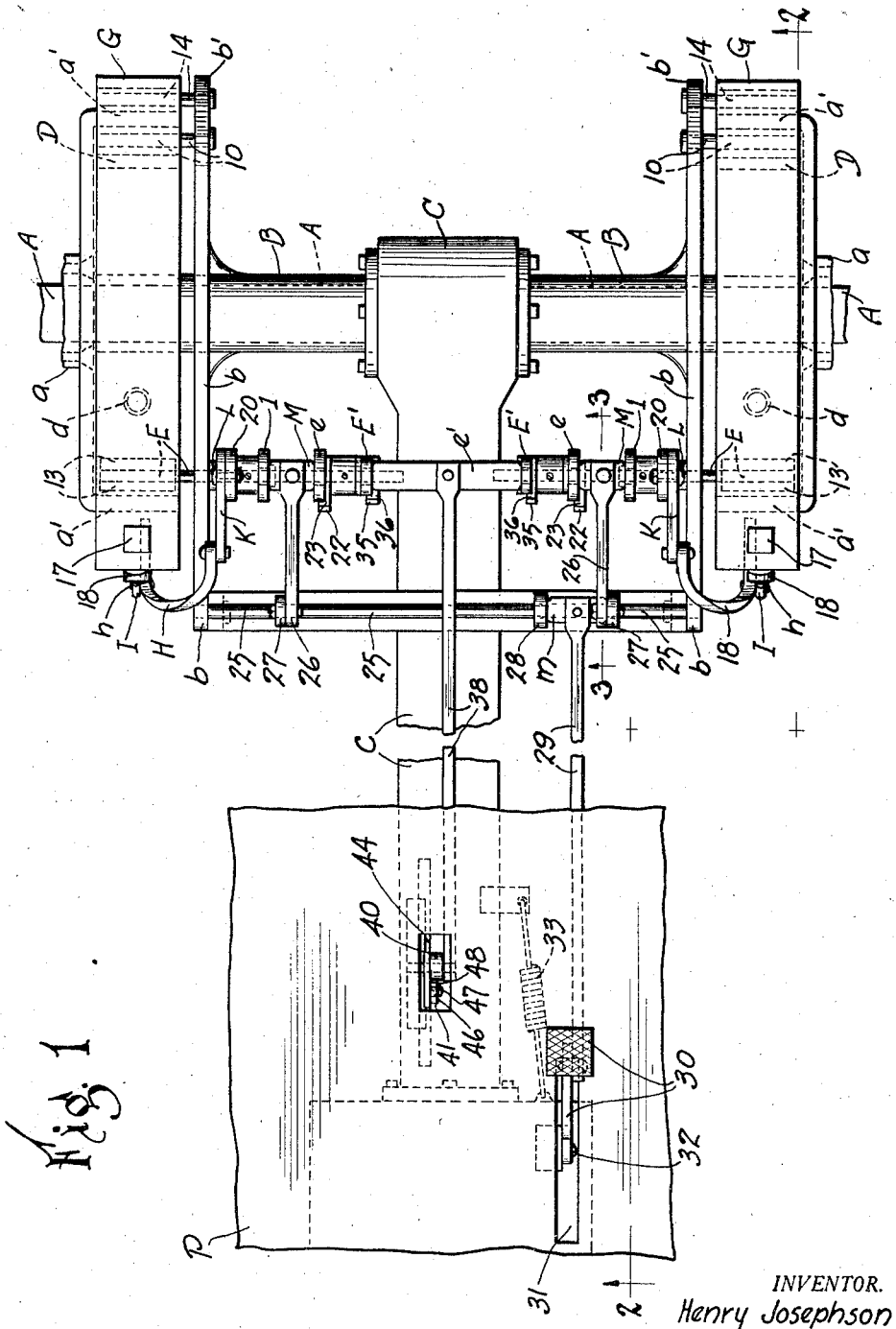
Figure 2:
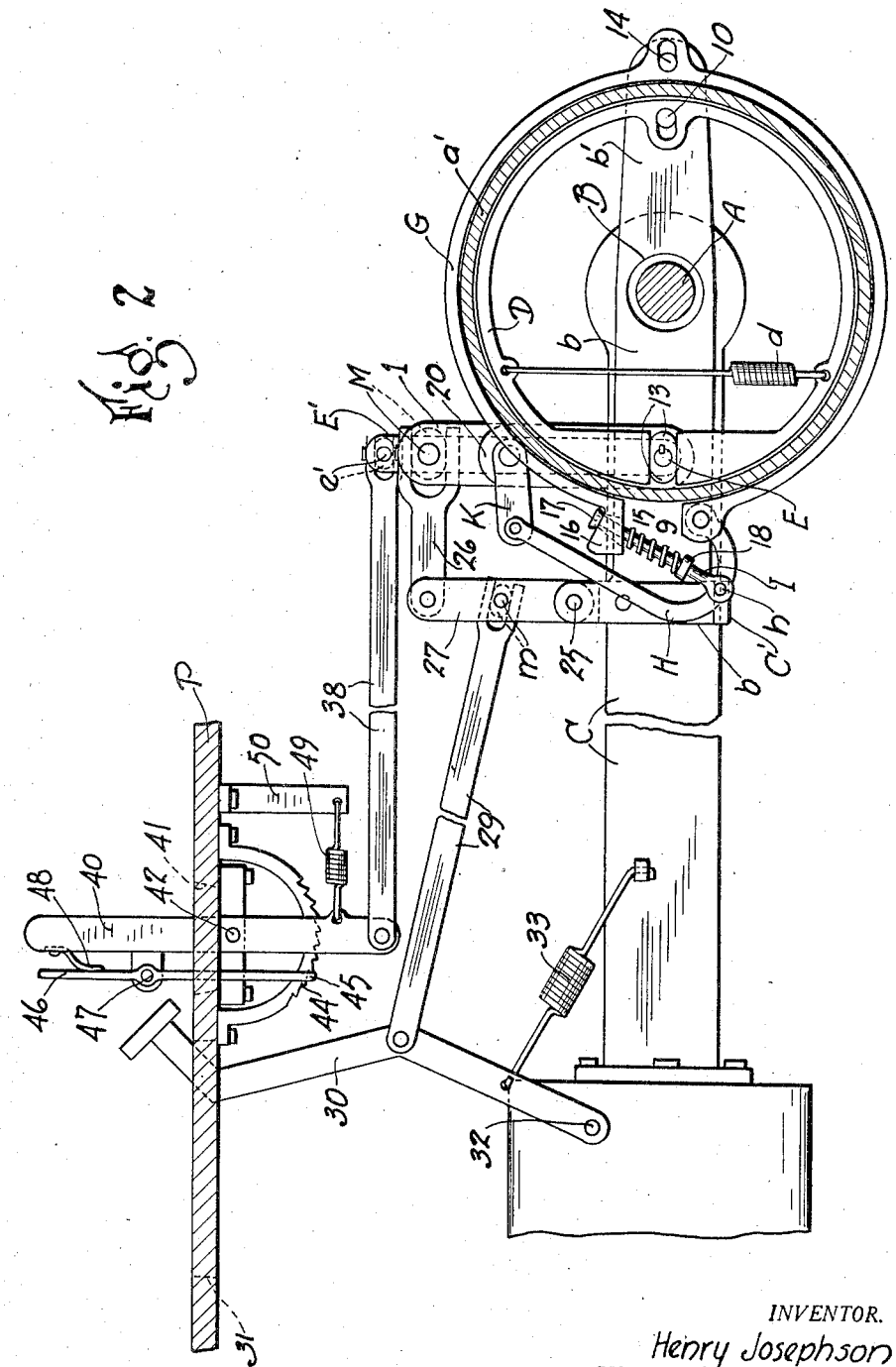
Figure 2 is a vertical section taken along the line 2—2, Figure 1.

Referring to Figures 1 and 2 of said drawings, A indicates the two suitably driven rotatable sections of the rear axle of an automobile or motor-vehicle. The axle-sections A are arranged in the usual manner transversely of the vehicle and substantially in line endwise, and $a$ indicates the inner end-portions of the hubs of the rear wheels of the vehicle. Each wheel-hub $a$ is operatively connected with the adjacent axle-section in any approved manner. Each axle-section is surrounded by a casing B which extends longitudinally of said axle-section between the wheel-hub connected to the outer end of said axle-section and the rear end-portion of the transmission-case C of the vehicle. Said transmission-case extends longitudinally of the vehicle and has said end-portion thereof arranged centrally between the rear wheels in the usual manner. At the inner end of the hub $a$ of each rear wheel is arranged a brake-drum which is secured to said wheel in any approved manner and has its annular brake-member $a'$ arranged concentrically relatively to said wheel and the connected axle-section. Each axle-casing B is provided, adjacent the inner end of the brake-drum, with two arms $b$ and $b'$ projecting forwardly and rearwardly respectively, and a brake-shoe D is arranged internally of said drum and held from rotating by a stud 10 rigid with the rearward arm $b'$ of the adjacent axle-casing.

Between the terminal ends of each brake-shoe D extends a brake-operating rock-shaft E which is arranged transversely of the vehicle and horizontally. The two shafts E of my improved brake-mechanism (see Figure 1) are arranged substantially in line endwise. Each shaft E is provided between the terminal ends of the adjacent brake-shoe D with two cams 13 adapted to actuate said brake-shoe into its braking position against the action of a suitably applied spiral spring $d$. Each shaft E is supported in any approved manner, as, for instance, from the forward arm $b$ of the transmission-case C and from the forward arm $b$ of the adjacent axle-casing, and said shaft and its cams 13 constitute a portion of the mechanism employed in operating said shaft independently of mechanism employed in the operation of an adjacent outer brake-shoe G which is arranged externally and extends circumferentially of the brake-member $a'$ arranged between said brake-shoes. Said outer brake-shoe is held from rotating or movement circumferentially of the adjacent brake-drum by a stud 14 rigid with the rearward arm $b'$ of the adjacent axle-casing. Said outer brake-shoe extends circumferentially of and nearly but not entirely around the adjacent brake-drum and has its terminal ends arranged adjacent the forward side of said drum and spaced circumferentially of the drum. Forward of the terminal ends of each brake-shoe G of my improved mechanism (see Figures 1 and 2) is a lever H which is fulcrumed or pivoted, as at $h$, to the lower end of an upright rod I which extends from said lever upwardly and loosely through a slot 15 formed in the outward enlargement 16 of the upper terminal end of said brake-shoe and only shown in dotted lines, Figure 2, and said rod is provided at its upper end with a head 17 resting on said enlargement of said brake-shoe. Said lever H extends rearwardly and forwardly of the lower end of the connected rod I and is attached rearwardly of said rod in any approved manner to the lower terminal end of the adjacent outer brake-shoe G, and forward of said rod said lever extends upwardly above the terminal end of said brake-shoe. Said rod is provided, with an upwardly facing shoulder 18, and a spiral spring $g$ is coiled around said rod to retain the terminal ends of said brake-shoe far enough separated to render said brake-shoe normally loose relative to the member $a'$ of the adjacent brake-drum. Said lever H is operatively connected at its upper end, by a link K, with an upwardly projecting arm 20 of a tubular shaft L which is loosely mounted on and extends longitudinally of the adjacent cam-shaft E and is spaced from the transmission-case C. It will be observed therefore that forward of each axle-section A is a brake-operating rock-shaft L which is arranged horizontally and transversely of the vehicle, and that said shaft L is shown surrounding a brake-operating shaft E which is shown extending endwise of and through the adjacent outer shaft L and rotatable independently of said outer shaft. The shaft L is provided at its inner end with an upwardly extending arm $l$, and said shaft L and its arms $l$ and 20, the link K connected to said arm 20 and the connected lever H and the rod I constitute mechanism for actuating the adjacent outer brake-shoe G into braking engagement with the brake-member $a'$ of the adjacent brake-drum. The relative arrangement of the parts is such that forward movement of the arm $l$ of said shaft L results in the rotation of said shaft in the direction required to cause the operative connection between the arm 20 of said shaft and the terminal ends of the adjacent brake-shoe G to draw said ends of said brake-shoe toward each other and thereby actuate said brake-shoe into its braking position.

Each inner brake-operating shaft E (see Figures 1, 3 and 4) is provided, adjacent the inner end of the outer brake-operating shaft L on said inner shaft, with a forwardly projecting arm 22, and a bell-crank lever $e$, having its arms of unequal length, is loosely mounted adjacent the inner end of said arm of and supported from said inner shaft. The said lever has its shorter arm 23 projecting forwardly and its other and longer arm extending upwardly, and the shorter arm of said lever abuts against the top side of the aforesaid arm 22 of said inner shaft in the normal position of the parts, and consequently the relative arrangement of the parts is such that said arm of said inner shaft is arranged to be actuated by the arm 23 of said lever during forward movement of the longer arm of said lever and in the direction required to effect the brake-applying rotation of said inner shaft. Said lever e employed in rotating the adjacent inner shaft E, and the arm l of the tubular outer shaft L associated with said inner shaft, are connected together by an equalizing bar M which is substantially parallel with said shafts and has bearing in and extends between the outer end-portions of and is carried by said arm of said outer shaft and the upwardly extending and longer arm of said lever, so that said shafts are rotated equally and in unison during movement of said bar forwardly and consequently in the direction required to effect the brake-applying rotation of said shafts and thereby result in the actuation of both of the adjacent brake-shoes D and G into their braking position. By the construction hereinbefore described it will be observed that adjacent the brake-drum connected with each rear wheel of the vehicle is a pair of shafts E and L which have their axes coincident, and that not only is the simultaneous operation of both shafts of each pair of brake-operating shafts E and L of no inconsiderable importance to the most successful operation of my improved brake-mechanism, but the simultaneous rotation of said shafts, through the medium of an equalizing bar, is an invaluable feature to the end of insuring that the rear wheel and connected axle-section adjacent said shafts are promptly, efficiently and gently braked without undue or detrimental shock to the vehicle and without annoyance or discomfort to the occupant or occupants of the vehicle.

Forward of each pair of shafts E and L is a rock-shaft 25 which is arranged transversely of the vehicle and substantially parallel with said rearward shafts E and L, and the equalizing bar M associated with said pair of shafts E and L is operatively connected, centrally between the adjacent lever e and the adjacent shaft-arm l, by a link 26, with an upwardly projecting arm 27 of the aforesaid forward shaft 25. The two forward shafts 25 of my improved brake-mechanism are preferably arranged substantially in line endwise and supported from the forward arms b of the axle-casings and from a cross-bar C' which is seated on the transmission-case C and extends between the forward ends of and is rigid with said arms of said axle-casings. Preferably one of the shafts 25 is considerably longer than the other of said shafts so that the adjacent or inner ends of said shafts are arranged at one side of the transmission-case. The arm 27 of the shorter of the forward shafts 25 is arranged adjacent the inner extremity of the respective shaft and the longer of said shafts is provided at its inner end with an upwardly projecting arm 28, and said arms of said shafts are connected together by an equalizing bar m which is substantially parallel with said shafts and has bearing in and extends between and is carried by said arms, so that said shafts are rotated equally and in unison during movement of said bar and the connected shaft-arms forwardly and consequently in the direction required to actuate the links 26 connected to the arms 27 of said shafts forwardly and thereby result in the forward actuation of the rearward equalizing bars M. The equalizing bar m is operatively connected, through the medium of a rod 29, with a foot-lever 30 which extends through a slot 31 in the foot-board P and is shown supported from the transmission-case. The slot 31 is of course large enough in dimensions to accommodate the location and operation of the lever 30, and preferably said lever has its fulcrum 32 parallel with the equalizing bar m and consequently parallel with the shafts 25. It will be observed therefore that the relative arrangement of the parts is such that the shafts 25 and their arms 27 and 28, the links 26, the equalizing bar m and the rod 29 form a simple and smoothly operating and reliable operative connection between the foot-lever 30 and the equalizing bars M and that forward movement of said lever results in the forward actuation of the last-mentioned equalizing bars simultaneously and in the actuation of all the brake-shoes D and G of the vehicle simultaneously into their braking position. A spring 33 which (see Figure 2) is attached at one end to the lever 30 and at its opposite end to the transmission-case, acts to retain said lever and the connected equalizing bars in their normal position, and therefore forward actuation of said equalizing bars is against the action of said spring.

The inner shaft E of each pair of brake-operating shafts E and L is provided between its arm 22 and the transmission-case C (see Figures 1, 4 and 6) with another forwardly projecting arm 35, and a bell-crank lever E' having one of its arms shorter than the other is loosely mounted adjacent the inner end of said arm 35 and supported from said inner shaft and has its longer arm projecting or extending upwardly and has its shorter arm 36 abutting against the top side of said arm 35 of said inner shaft in the normal position of the parts, and consequently the relative arrangement of the parts is such that said inner shaft is arranged to be actuated by said shorter arm of said lever during forward movement of the longer arm of said lever and in the direction required to effect the brake-applying rotation of said inner shaft. The levers E' employed in rotating the inner shafts of the two pairs of shafts E and L are connected together by an equalizing bar e' which is substantially parallel with said shafts and extends between and has bearing in the outer end-portions of and is carried by said levers, as shown in Figures 1, 3 and 4, so that said shafts are rotated equally and in unison during forward movement of said bar and in the direction required to effect the brake-applying rotation of said shafts and thereby result in the actuation of both of the inner brake-shoes D into their braking position independently of the levers e on said shafts and independently of the tubular outer shafts L and the outer brake-shoes. It will be observed that the lever e for each shaft E (see Figures 3 and 4) has its inner end recessed or cut away, as at 37, or contoured in any approved manner to accommodate the location of the arm 22 of said shaft during the brake-applying rotation of said shaft through the medium of the arm 35 of said shaft and lever E' for said shaft independently of the lever e for said shaft, and hence the arms 22 of the shafts E move idly during the brake-applying rotation of said shafts through the medium of the equalizing bar e'.

The equalizing bar e' is operatively connected, through the medium of a rod 38, with an upright hand-lever 40 which extends through a slot 41 in the foot-board P and is supported from said foot-board and has its fulcrum 42 below the foot-board. The slot 41 is of course large enough in dimensions to accommodate the location and operation of said hand-lever, and preferably said lever has its axis parallel with the equalizing bar e'.

Under the foot-board P and at one side of the lever 40 is a segmental rack 44 secured to said foot-board. Said rack extends circumferentially of the under side of and is arranged concentrically relatively to the fulcrum 42 of the lever 40 and has its teeth formed at its under side, and a pawl 45 is normally in engagement with said rack and has an arm 46 extending upwardly through the slot 41 in the foot-board. The pawl-arm 46 is pivoted, as at 47, above the foot-board to the lever 40 and has its axis parallel with the axis of the lever. Between the pawl-drum 46 and the lever 40, above the axis of said arm, is a spring 48 supported from the lever and acting to retain the pawl in its operative position. The relative arrangement of the parts is such that the rack 44 and pawl 45 do not interfere with the actuation of the lever 40 against the action of a spiral spring 49 and in the direction required to effect the brake-applying rotation of the cam-shafts E by and during the forward endwise movement of the equalizing bar e', but constitute locking means for locking said lever against return movement. The spring 49 is shown attached at one end to the lever 40 and at its outer end to a member 50 depending from and rigid with the foot-board P.

It will be observed that the arms 35 of the inner shafts E of the two pairs of shafts E and L move idly during the forward movement of the equalizing bars m and M by the requisite operation of the foot-lever 30, so that the levers E' and connected equalizing bar e' and the hand-lever 40 are not disturbed during said actuation of the brake-shoes D and G into their braking position by motion transmitted from the foot-lever, and I would here remark that (see Figures 4 and 6) the lever E' for each shaft E has its inner end shown recessed or cut away, as at 51, or suitably contoured to accommodate the location of the arm 35 of said shaft during the brake-applying rotation of said shaft through the medium of the arm 22 of said shaft and lever e for said shaft independently of the lever E' for said shaft.

The present application is a refiling of my abandoned application Serial Number 192,657 originally filed on September 22, 1917.

I claim:

1. In brake-mechanism for an automobile, a brake-operating shaft, a tubular brake-operating shaft loosely embracing a portion of the first-mentioned shaft, an equalizing bar associated and substantially parallel with and arranged adjacent said shafts, a lever for operating the inner shaft and embracing said bar, an arm on the outer shaft and embracing said bar, and means for actuat'ng said bar, the inner shaft being free to operate independently of the aforesaid lever.

2. In brake-mechanism for an automobile, a brake-operating shaft, a tubular brake-operating shaft loosely embracing a portion of the first-mentioned shaft, an equalizing bar associated and substantially parallel with and arranged adjacent said shafts, a lever for operating the inner shaft and embracing said bar, an arm on the outer shaft and embrac'ng said bar, means for actuating said bar, and another lever for operating the inner shaft, said inner shaft being free to be operated by one lever independently of the other lever.

3. In brake-mechanism for an automobile, a pair of brake-operating shafts each extending substantially transversely of said automobile, an equalizing bar associated and substantially parallel with and arranged adjacent said shafts, a lever for operating one shaft and embracing said bar, an arm on the other shaft and embracing said bar, and means for actuating said bar, the shaft which is adapted to be operated by said lever being free to operate independently of the lever.

4. In brake-mechanism for an automobile, a pair of brake-operating shafts each extending substantially transversely of said automobile, an equalizing bar associated and substantially parallel with said shafts, a lever for operating one shaft embracing said bar, another lever for operating said shaft independently of said bar, an arm on the other shaft embracing said bar, and means for actuating said bar, the shaft being free to be operated by one lever independently of the other lever.

5. In brake-mechanism for an automobile, the combination, with two pairs of brake-operating shafts each extending substantially transversely of said automobile, said pairs being spaced transversely of the automobile, two equalizing bars associated respectively with the different pairs of shafts, each of said bars being operatively connected with the associated shafts, and one of the shafts of each pair of shafts being free to operate independently of the associated equalizing bar, of two rock-shafts arranged forward of the different aforesaid equalizing bars respectively, an equalizing bar associated and operatively connected with the last-mentioned shafts, means for actuating the last-mentioned bar, an operative connection between one of the first-mentioned equalizing bars and one of the last-mentioned shafts, and an operative connection between the other of said first-mentioned equalizing bars and the other of said last-mentioned shafts.

6. A brake mechanism for an automobile, comprising a pair of brake operating shafts each extending substantially transversely of said automobile, levers carried by said shafts and adapted to operate said shafts through lost motion mechanisms, means connected with said levers for actuat'ng said shafts, tubular shafts mounted on said first mentioned shafts adapted to actuate a set of brakes other than those actuated by the first mentioned shafts, levers fixed to said tubular shafts and associated through equalizing bars with levers, carried by said first mentioned shafts and connected therewith through lost motion mechanism and means for actuating said equalizing bars to actuate both sets of brakes.

7. A brake system for vehicles comprising a plurality of sets of brakes associated with wheels of said vehicles, a shaft associated with each wheel for actuating one set of brakes, a plurality of levers carried by said shafts and connected therewith through lost motion mechanism, equalizing means for actuating said shafts, tubular shafts carried by said first mentioned shafts and adapted to actuate the other set of brakes, and means for positively actuating both sets of brakes.

8. A brake system for vehicles comprising a plurality of sets of brakes associated with wheels of said vehicle, a shaft associated with each wheel for actuating one set of brakes, a plurality of levers carr'ed by said shafts and connected therewith through lost motion mechanism, equalizing means for actuating said shafts, tubular shafts carried by said first mentioned shafts and adapted to actuate the other set of brakes, levers fixed to said tubular shafts and other levers carried by the first mentioned shafts and connected therewith through lost motion mechanism, equalizing bars extending between the lever fixed to the tubular shafts and the other levers carried by the other shafts and means for moving said equalizing bars to actuate both sets of brakes.

9. In a brake mechanism for an automobile, a brake operating shaft, a tubular brake operating shaft loosely embracing a portion of the first mentioned shaft, an equalizing member associated with said shafts, a lever for operating the inner shaft and embracing said equalizing member, an arm on the outer shaft and embracing said member, means for actuating the equalizing member and another lever for operating the inner shaft, the inner shaft being free to be operated by either lever independently of the other.

10. A brake actuating mechanism for vehicles comprising a pair of brake operating shafts each extending substantially transversely of the vehicle, an equalizing member associated with said shafts, a lever operating one shaft and embracing said member, an arm on the other shaft embracing said member, means for actuating one of said shafts independently of the other and means for actuating said member to impart motion to both of said shafts.

11. A brake mechanism for vehicles comprising a pair of brake operating shafts each extending substantially transversely of the vehicle, one of said shafts being operatively connected with one brake on said vehicle and the other of said shafts being operatively connected with another brake on said vehicle, independent of the first mentioned brake, an equalizing member associated with said shafts, a lever for operating one shaft and embracing said member, an arm on the other shaft embracing said member and means for actuating said member to simultaneously actuate both brakes, and means associated with the lever operated shaft to apply the brake actuated by that shaft independently of the other brake.

12. A brake actuating mechanism for vehicles comprising a plurality of shafts each extending substantially transversely of the vehicle, each of said shafts being operatively connected with a brake actuating means, a lever carried by each of said shafts and connected therewith through a lost motion mechanism, means for equally applying a force to both of said levers to actuate the brakes associated therewith, a second lever carried by each of said shafts and connected therewith through lost motion mechanism, other shafts parallel to said first mentioned shafts and operatively connected with the actuating means of other brakes, an arm fixed to each of said last mentioned shafts, an equalizing means connected with the arm fixed to one of the last mentioned shafts and to the second lever carried by one of the first mentioned shafts, similar connection between the other shafts, and means for applying a force to said equalizing members to simultaneously apply both sets of brakes.

13. A brake actuating mechanism for an automotive vehicle comprising a plurality of shafts mounted on each side to extend substantially transversely of said vehicle, each shaft adapted to actuate individual brakes, one shaft on each side of said vehicle having an arm fixedly carried thereby, the other shaft on each side of said vehicle having a plurality of levers carried thereby, each of which is connected with the shaft by a lost motion mechanism, an equalizing member connecting one of said last mentioned levers with the arm fixed to the other shaft, a similar mechanism on the other side of said vehicle and means for equally applying a force to the equalizing members on both sides of said vehicle and means for applying an equal force to the other levers carried by the shafts on each side of the vehicle.

14. A brake actuating mechanism for an automotive vehicle comprising a plurality of shafts mounted on one side to extend substantially transversely of the vehicle, each of said shafts adapted to actuate an independent brake mechanism, one of said shafts having an arm fixed thereto, the other of said shafts having a plurality of levers carried thereby and connected thereto through lost motion mechanism, an equalizing member connecting said arm with one of said levers, a similar mechanism on the other side of said vehicle, equalizing means connecting the levers which are free from the arms carried by the other shafts and means for applying a force thereto to operate one brake on each side of the vehicle, and equalizing means for applying an equal force to the equalizing members on each side of said vehicle to simultaneously apply all of said brakes.

15. In braking mechanism for an automobile, a pair of brake operating shafts each extending substantially transversely of said automobile, an equalizing bar associated and substantially parallel with and arranged adjacent to said shafts, a member for operating one shaft and embracing said bar, a member for operating the other shaft and embracing said bar, and means for actuating said bar, one of said shafts being free to operate independently of its associated member.

HENRY JOSEPHSON.